United States Patent [19]

Moser et al.

[11] 3,937,637

[45] Feb. 10, 1976

[54] ROLL CONTACT FUSER

[75] Inventors: Rabin Moser, Fairport; John G. Ruhland, Rochester, both of N.Y.

[73] Assignee: Xerox Corporation, Stamford, Conn.

[22] Filed: July 27, 1973

[21] Appl. No.: 383,231

[52] U.S. Cl. ................ 148/6; 148/6.14 R; 427/345; 427/399; 427/359; 427/22; 427/366; 118/60

[51] Int. Cl.[2] ........................................ B32B 15/04

[58] Field of Search ................ 117/5.3, 17.5, 132 C; 219/216; 432/60; 118/60; 264/126; 148/6, 6.14

[56] References Cited

UNITED STATES PATENTS

| | | | |
|---|---|---|---|
| 2,851,330 | 9/1958 | Taylor | 117/5.3 X |
| 2,902,376 | 9/1959 | Beacher | 117/5.3 X |
| 3,253,932 | 5/1966 | White et al. | 117/5.3 |
| 3,284,248 | 11/1966 | Rumberger | 117/5.3 X |
| 3,666,247 | 5/1972 | Banks | 432/60 |
| 3,745,972 | 7/1973 | Thettu | 118/60 X |
| 3,751,216 | 8/1973 | Gregory | 432/60 |

OTHER PUBLICATIONS

Gomulka, IBM Tech. Discl. Bull, Vol. 13, No. 11 Apr. 1971, 219–216.

Kirk–Othmer, Encyclopedia of Chem. Technology, 2nd Ed. Vol. 14, 1967, Interscience p. 238.

*Primary Examiner*—Ralph S. Kendall
*Assistant Examiner*—Charles R. Wolfe, Jr.
*Attorney, Agent, or Firm*—James J. Ralabate; Benjamin B. Sklar; Ernest F. Chapman

[57] ABSTRACT

A contact fuser assembly for use in a electrostatic reproducing apparatus including an internally heated fuser roll structure comprising a rigid or non-deformable thermally conductive core capable of interacting with a release material applied thereto in such a manner as to form a thermally-stable interfacial coating intermediate the surface of the core and a release coating comprising portions of the release material. The interfacial coating strongly adheres to the core surface and prevents toner material from contacting the outer surface of the core. The combined coatings have a sub-micron thickness and therefore represent a minimal thermal barrier to the energy being conducted outwardly by the core.

30 Claims, 3 Drawing Figures

ROLL CONTACT FUSER

BACKGROUND OF THE INVENTION

This invention relates generally to xerographic copying apparatus and, more particularly, to a contact fusing system for fixing electroscopic toner material to a support member.

In the process of Xerography, a light image of an original to be copied is typically recorded in the form of a latent electrostatic image upon a photosensitive member with subsequent rendering of the latent image visible by the application of electroscopic marking particles, commonly referred to as toner. The visual image can be either fixed directly upon the photosensitive member or transferred from the member to a sheet of plain paper with subsequent affixing of the image thereto.

In order to permanently affix or fuse electroscopic toner material onto a support member by heat, it is necessary to elevate the temperature of the toner material to a point at which the constituents of the toner material coalesce and become tacky. This action causes the toner to be absorbed to some extent into the fibers of the support member which, in many instances, constitutes plain paper. Thereafer, as the toner material cools, solidification of the toner material occurs causing the toner material to be firmly bonded to the support member. In both the xerographic as well as the electrographic recording arts, the use of thermal energy for fixing toner images onto a support member is old and well known.

One approach to thermal fusing of electroscopic toner images onto a support has been to pass the support with the toner images thereon between a pair of opposed roller members, at least one of which is internally heated. During operation of a fusing system of this type, the support member to which the toner images are electrostatically adhered is moved through the nip formed between the rolls with the toner image contacting the fuser roll to thereby effect heating of the toner images within the nip. By controlling the heat transferred to the toner, virtually no offset of the toner particles from the copy sheet to the fuser roll is experienced under normal conditions. This is because the heat applied to the surface of the roller is insufficient to raise the temperature of the surface of the roller above the "hot offset" temperature of the toner whereas the toner particles in the image areas of the toner would liquify and cause a splitting action in the molten toner to thereby result in "hot offset". Splitting occurs when the cohesive forces holding the viscous toner mass together is less than the adhesive forces tending to offset it to a contacting surface such as a fuser roll.

Occasionally, however, toner particles will be offset to the fuser roll by an insufficient application of heat to the surface thereof (i.e. "cold" offsetting); by imperfections in the properties of the surface of the roll; or by the toner particles insufficiently adhering to the copy sheet by the electrostatic forces which normally hold them there. In such a case, toner particles may be transferred to the surface of the fuser roll with subsequent transfer to the backup roll during periods of time when no copy paper is in the nip.

Moreover, toner particles can be picked up by the fuser and/or backup roll during fusing or duplex copies or simply from the surroundings of the reproducing apparatus.

One arrangement for minimizing the foregoing problems, particularly that which is commonly referred to as "offsetting" has been to provide a fuser roll with an outer surface or covering of polytetrafluoroethylene, commonly known as Teflon, to which a release agent such as silicone oil is applied, the thickness of the Teflon being on the order of several mils and the thickness of the oil being less than 1 micron. Silicone based oils, which possess a relatively low surface energy, have been found to be materials that are suitable for use in the heated fuser roll environment where Teflon constitutes the outer surface of the fuser roll. In practice, a thin layer of silicone oil is applied to the surface of the heated roll to thereby form an interface between the roll surface and the toner images carried on the support material. Thus a low surface energy layer is presented to the toner as it passes through the fuser nip and thereby prevents toner from offsetting to the fuser roll surface.

A fuser roll construction of the type described above is fabricated by applying in any suitable manner a solid layer of adhesive material to a rigid core or substrate, such as the solid Teflon outer surface or covering of the aforementioned arrangement. The resulting roll structure is subject to degradation due to continued operation at elevated temperatures and also to damage from accidental gouging by stripper fingers conventionally employed in such systems. The foregoing in many instances necessitates replacement of the fuser roll which is quite costly when a large number of machines are involved.

Moreover, since a several mil thickness of polytetrafluoroethylene along with the coating of silicone oil constitutes a poor thermal conductor, longer nip dwell and higher fuser roll temperatures are required to deliver the fusing energy required. Also, control of the surface temperature of the roll presents a problem due to large temperature variations occuring before and after contacting of the substrate carrying the images.

In view of the foregoing, it would appear that the high thermal conductivity and wear resistance of bare metals or similar materials would be desirable for utilization in fuser roll structures, however, such materials have, heretofore, not been found satisfactory for such application. The latter is attributable to the very high surface energy of metals and similar materials which renders them readily wettable by hot toner materials. Once wetted by hot toner, it has been very difficult if not impossible to remove the toner from such materials while they remain hot. Commonly used release agents such as pure silicone oils have been tried in combination with various metals and other high surface energy materials but with relatively little or no success.

Accordingly, the principal object of this invention is to provide a new and improved electrostatic copying apparatus.

Another object of this invention is to provide a new and improved fusing apparatus for use in fixing toner images to a copy sheet.

Another object of this invention is to provide, for use in a photocopying apparatus, a fuser that is self-repairing and therefore has a continuously renewable surface.

Yet another object of the invention is to provide a fusing apparatus employing a release agent wherein the release agent is a solid at room temperature and a liquid during fusing of the toner images to a copy paper.

Another object of this invention is to provide, in an electrophotographic apparatus, a roll fusing device wherein the roll members of the device need not be separated during stand-by periods of operation.

Still another object of this invention is to provide a new and improved contact fuser wherein an interfacial layer is formed, during the operation of the fuser, intermediate the fuser surface and portions of a release substance applied thereto whereby toner is prevented from contacting the fuser surface.

Another object of this invention is to provide, in a photocopying apparatus, a fusing device for toner images wherein a coating is formed during operation of the fuser at the interface of the fuser roll surface and a release agent through chemical reaction of the oxidized release agent and the metal oxide of the fuser roll.

Still another object of this invention is to provide a new and improved apparatus and method for fusing toner images to a substrate wherein toner barrier and toner release coatings are formed on a thermally conductive core and wherein the combined thickness of the coatings is insufficient to establish a thermal barrier to the energy being conducted through the core.

BRIEF SUMMARY OF THE INVENTION

The above-cited objects of the present invention are accomplished by the provision of a contact fuser assembly preferably comprising an internally-heated roll fuser structure having a core member which is rigid and is capable of interacting with release material applied thereto to form a thermally-stable coating which strongly adheres to the core and a release coating which covers the thermally-stable coating. The combined coatings have a sub-micron thickness and therefore constitute a minimal barrier to heat transfer.

In the preferred embodiment of the invention, the core is fabricated from copper and the release material is low molecular weight polyethylene. While it is not completely understood why the thermally-stable coating with the release coating thereover is formed, one hypothesis is that the polyethylene oxidizes thereby producing carboxylic acid which chemically reactes with the copper core to form the coating. The coating, however formed, has been observed to have a greater affinity for the core than the toner and thereby prevents toner from contacting the core, while the release coating provides a material the cohesive force of which is less than the adhesive forces between the toner and the substrate and the cohesive forces of the toner. It has further been observed that the thermally-stable layer is continuously renewable or self-repairing. That is to say, that if this coating is damaged as by uneven pressures exerted by the blade utilized for metering the release material to the core or by undue forces exerted by the finger is employed for stripping the substrate from the fuser roll structure, the thermally-stable coating will repair itself.

Other objects and advantages of the present invention will become apparent when read in conjunction with the accompanying drawings wherein.

DETAILED DESCRIPTION OF THE PREFERRED EMBODIMENT

Figure 1:
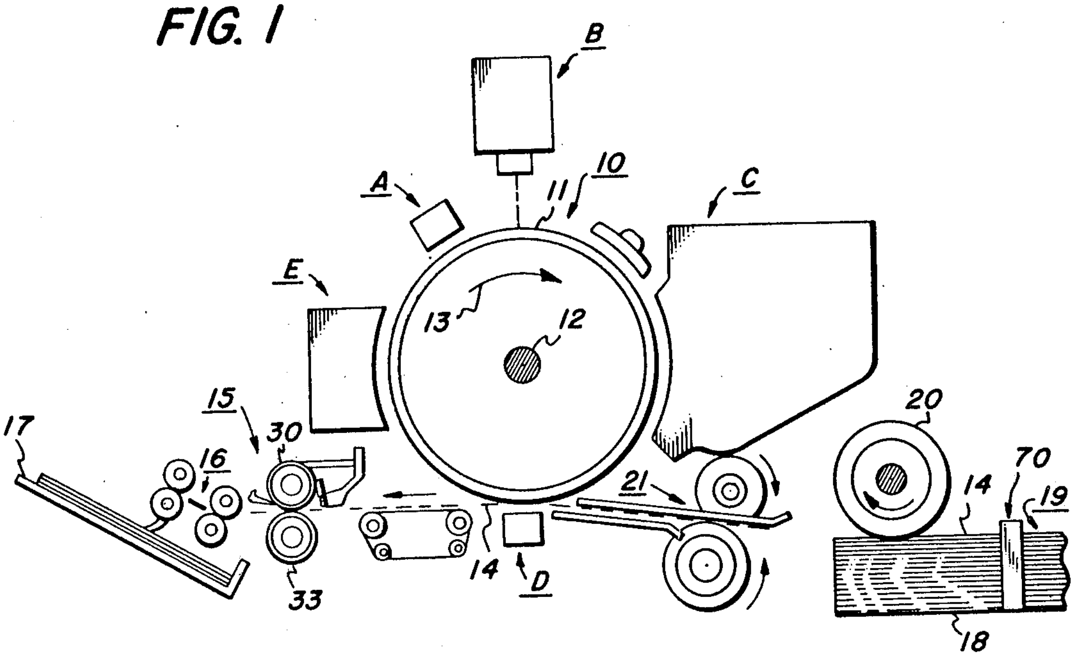
FIG. 1 is a schematic representation of a xerographic reproducing apparatus incorporating the novel contact fuser of this invention.
Figure 2:
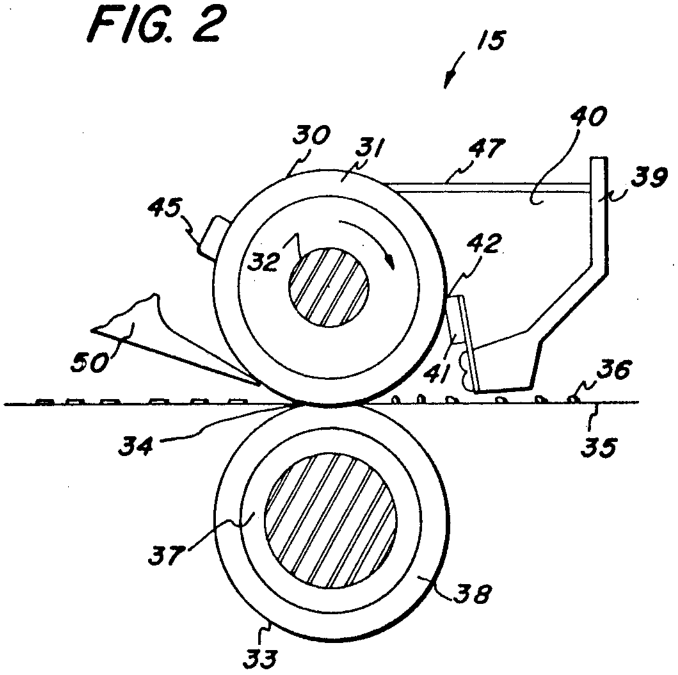
FIG. 2 is a side elevational view of a fuser system incorporated in the apparatus of FIG. 1.
Figure 3:
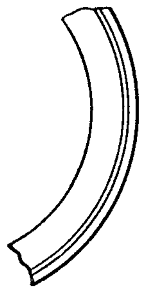
FIG. 3 is a fragmentary view of a fuser roll during operation.

The reproducing machine illustrated in FIG. 1 employs an image recording drum-like member 10 the outer periphery of which is coated with a suitable photoconductive material 11. One type of photoconductive material is disclosed in U.S. Pat. No. 2,970,906 issued to Bixby in 1961. The drum 10 is suitably journaled for rotation within a machine frame (not shown) by means of a shaft 12 and rotates in the direction indicated by arrow 13, to bring the image retaining surface thereon past a plurality of xerographic processing stations. Suitable drive means (not shown) are provided to power and coordinate the motion of the various cooperating machine components whereby a faithful reproduction of the original input scene information is recorded upon a sheet of final support material such as paper or the like.

Since the practice of xerography is well known in the art, the various processing stations for producing a copy of an original are herein represented in FIG. 1 as blocks A to E. Initially, the drum moves photoconductive surface 11 through a charging station A. At charging station A an electrostatic charge is placed uniformly over the photoconductive surface 11 of the drum 10 preparatory to imaging. The charging may be provided by a corona generating device of a type described in U.S. Pat. No. 2,836,725 issued to Vyverberg in 1958.

Thereafter, the drum 10 is rotated to exposure station B where the charged photoconductive surface 11 is exposed to a light image of the original input scene information, whereby the charge is selectively dissipated in the light exposed regions to record the original input scene in the form of a latent electrostatic image. A suitable exposure system may be of the type described in U.S. patent application, Ser. No. 259,181 filed June 2, 1972.

After exposure, drum 10 rotates the electrostatic latent image recorded on the photoconductive surface 11 to development station C, wherein a conventional developer mix is applied to the photoconductive surface 11 of the drum 10 rendering the latent image visible. A suitable development station is disclosed in U.S. patent application Ser. No. 199,481 filed Nov. 17, 1971. This application describes a magnetic brush development system utilizing a magnetizable developer mix having carrier granules and toner comprising electrophotographic resin plus colorant from dyes or pigments. A developer mix is continually brought through a directional flux field to form a brush thereof. The electrostatic latent image recorded on photoconductive surface 11 is developed by bringing the brush of developer mix into contact therewith. The developed image on the photoconductive surface 11 is then brought into contact with a sheet of final support material 14 within a transfer station D and the toner image is transferred from the photoconductive surface 11 to the contacting side of the final support sheet 14. The final support material may be plain paper, gummed labels, transparencies such as Polycarbonate, Polysulfane and Mylar, etc., as desired.

After the toner image has been transferred to the sheet of final support material 14, the sheet with the image thereon is advanced to a suitable fuser assembly 15 which fuses the transfer powder image thereto. After the fusing process, the final support material 14 is advanced by a series of rolls 16 to a copy paper tray 17 for subsequent removal therefrom by a machine operator.

Although a preponderence of the toner powder is transferred to the final support material 14, invariably some residual toner remains on the photoconductive surface 11 after the transfer of the toner powder image to the final support material 14. The residual toner particles remaining on the photoconductive surface 11 after the transfer operation are removed from the drum 10 as it moves through cleaning station E. Here the residual toner particles are first brought under the influence of a cleaning corona generating device (not shown) adapted to neutralize the electrostatic charge remaining on the toner particles. The neutralized toner particles are then mechanically cleaned from the photoconductive surface 11 by conventional means as for example, the use of a resiliently biased knife blade as set forth in U.S. Pat. No. 3,660,863 issued to Gerbasi in 1972.

The sheets of final support material 14 processed in the automatic xerographic reproducing device may be stored in the machine within a removable paper cassette 18. A suitable paper cassette is set forth in U.S. patent application Ser. No. 208,138 filed Dec. 15, 1971.

The copier can also have the capability of accepting and processing copying sheets of varying lengths. The length of the copy sheet, of course, being dictated by the size of the original input scene information recorded on the photoconductive surface 11. To this end, the paper cassette 18 is preferably provided with an adjustable feature whereby sheets of varying length and width can be conveniently accommodated therein.

In operation, the cassette 18 is filled with the stack of final support material 19 of pre-selected size and the cassette 18 is inserted into the machine by sliding along a baseplate (not shown) which guides the cassette 18 into operable relationship with a pair of feed rollers 20. When properly positioned in communication with the feed rollers 20 the top sheet of the stack 19 is separated and forwarded from the stack 19 into the transfer station D by means of registration rollers 21.

It is believed that the foregoing description is sufficient for purposes of present application to illustrate the general operation of an automatic xerographic copier which can embody the teachings of the present invention.

The fuser assembly 15 comprises heated roll structure 30 including a hollow cylinder or core 31 having a suitable heating element 32 disposed in the hollow portion thereof which is coextensive with the cylinder. The heating element 32 may comprise any suitable type heater for elevating the surface temperature of the cylinder to operational temperatures, therefore, 250°–400° F. For example, it may be a quartz lamp. The cylinder 31 is fabricated from any suitable material capable of acccomplishing the objects of the present invention. Typical materials are anodized aluminum and alloys thereof, steel, stainless steel, nickel and alloys thereof, nickel plated copper, chrome plated copper, and glass. The resulting structure has an outside diameter on the order of 1.5 to 3.0 inches and has a length on the order of 10 to 15 inches. Power requirements for the foregoing are 500–2500 watts peak power with an average power of 300–2000 watts and 75–250 watts for standby.

The surface temperature of the fuser roll structure is controlled by contacting the surface thereof with a thermistor probe 45 as described in U.S. Pat. No. 3,327,096, issued in 1967 to Bernous and incorporated herein by reference.

The fuser assembly 15 further comprises a backup roll structure 33 which cooperates with the fuser roll structure 30 to form a nip 34 through which a copy paper or substrate 35 passes such that toner images 36 thereon contact the fuser roll structure. The backup roll structure may comprise any suitable construction, for example, a steel cylinder, but preferably comprises a rigid steel core 37 having a Viton elastomer surface or layer 38 thereon. A suitable backup roll has a core approximately 1.8 inches in diameter with a 0.1 inch cover or layer structure of Viton elastomer or other suitable high temperature elastomeric layer structure, for example, silicone rubber and a combination of Viton or silicone rubber with Teflon thereon. Vitron is the trademark of Dupont Co. The specific dimensions of the members making up the backup roll will be dictated by the requirements of the particular copying apparatus wherein the fuser assembly 15 is employed, the dimensions being greater or less depending upon the process speed of the machine. The heated roll and backup roll structures are mounted on fixed axes and, therefore, are not moved in and out of engagement as fuser rolls of prior art devices.

Means (not shown) for applying a loading force in a conventional manner to the fuser assembly 15 serves to create nip pressures on the order of 15 to 150 psi average. The durometer of the backup roll is chosen such that "dwell times" of 5 to 100 milliseconds can be obtained with loading forces within the aforementioned range of pressures. "Dwell time" is proportional to the ratio of the nip length to the surface speed of the rolls. For a given angular velocity the surface speeds will vary depending upon the diameter of the rolls. For example, with a 2 inch fuser roll speed of 0 to 30 inches per second are attainable and for a 3 inch fuser roll speeds of 0 to 45 inches per second have been attained. Accordingly, it can be seen that the aforementioned "dwell times" can be obtained by varying one or the other or both of the "dwell time" relationships. Durometers of 20–90 Shore A have been found to provide satisfactory results.

The aforementioned materials from which the fuser roll structure 30 may be fabricated are relatively high surface energy materials, consequently, hot toner material contacting such surfaces would readily wet the surface of the fuser roll. Accordingly, there is provided a sump 39 for containing a release material 40 capable of interacting with the fuser roll in accordance with objects of the present invention. The release material is preferably a low molecular weight material which is solid at room temperature and which has a relatively low viscosity at the operating temperatures of the fuser roll structure. An example of such a material is polyethylene homopolymer manufactured by Allied Chemical Company and having the designation AC-8 homopolymer.

A metering blade 41 preferably of silicone rubber is mounted to the sump 39 by conventional means such that an edge 42 thereof contacts the fuser roll structure serves to meter the release agent 40 in its liquid state onto the fuser roll. In the preferred embodiment, a blade 0.060 inch thick and having a width of 1.05 inch and length of 15 inches has been employed. By means of such a construction a 0.1–0.5 $\mu$ thickness of release agent is applied to the surface of the fuser roll. The blade 41 also aids in cleaning the fuser roll of toner.

A pair of end seals 47, preferably of sponge rubber are provided to contain the release agent in the sump 39. One or more stripper fingers 50 are provided for ensuring removal of the substrate from the fuser roll.

The toner that forms the toner images 36 is comprised of an electrophotographic resin plus colorant from dyes and pigments such as carbon black and furnace black. The developer material of which the toner forms a portion may contain cleaning materials and plasticisers in accordance with the desired formulation. Typical toners comprise a copolymerized mixture of styrene or a blend of styrene homologs with 10 to 40% of one or more methacrylate esters selected from the group consisting of ethyl, propyl and butyl methacrylates, as described in U.S. Pat. No. 3,079,342 and incorporated herein by reference.

The effectiveness of a fuser assembly of the type herein described has been demonstrated by the employment of three inch diameter steel rolls operated at speeds up to 35 inches per second. The surface temperature of the fuser roll was maintained at 300°F and a loading on the rolls of 120 pounds per linear inch was applied. Low molecular weight polyethylene was applied to the fuser roll and substrates having the aforementioned toner adhered thereto in image configuration were passed between the rolls with the toner contacting the fuser roll. There was no evidence of offsetting of toner to the fuser roll.

The effectiveness of the fuser assembly of the type herein contemplated has further been demonstrated by forming electrostatic latent images on the recording surfaces which were then developed by a heat fusable toner comprising carbon black pigmented copolymer, styrene-n-butylmethacrylate, the fusable toner particles being held on the recording surfaces in conformance with the electrostatic latent images. The toner images were thereafter transferred to plain paper. The paper having the toner images electrostatically adhered thereto was then passed, at a speed of 15 inches/second between a fuser roll structure and a backup roll the former of which is heated to a temperature of 310°F. with a pressure of 140 psi being applied to the roll pair. The toner images contacted the fuser roll structure which has a 2.0 inch outside diameter and is 15 inches long. The backup roll has an outside diameter of 2.0 inches with a 0.1 inch layer of silicone rubber covered with a 0.020 inch of fluorinated ethylene-propylene resin on the surface and having a durometer of 65 Shore A. The fuser roll structure was fabricated from copper having an 8 micro-inch finish. A release agent consisting of low molecular weight polyethylene designated A.C.-8 by the Allied Chemical Corporation was liquified and metered onto the copper surface prior to contacting thereof by the toner images. One hundred thousand copies were made without offsetting of toner to the fuser roll structure being observed after the final copy sheets are passed between the rolls.

Another demonstration of the effectiveness of the fuser assembly of the type herein contemplated was effected by forming electrostatic images on recording surfaces which were then developed by heat fusable toner comprising carbon black pigmented copolymer, styrene-n-buthylmethacrylate, the fusable toner particles being held on the recording surface in conformance with the electrostatic latent images. The toner images were thereafter transferred to plain paper. The paper having the toner images electrostatically adhered thereto was then passed, at a speed of 4.0 inches per second, between a fuser roll structure and a backup roll, the former of which is heated to a temperature of 280°F. with a pressure of 65 psi being applied to the roll pair. The toner images contacted the fuser roll structure which has a 2.0 inch outside diameter and is 10 inches long. The backup roll has an outside diameter of 2 inches with a 0.2 inch micron layer as the outer surface thereof and has a durometer of 65 Shore A. The fuser roll structure is fabricated from copper having an 8 micro-inch finish. A release agent consisting of low molecular weight polyethylene designated A.C.-8 by the Allied Chemical Corporation was liquified and metered onto the copper surface prior to contacting thereof by the toner images. No offsetting of toner to the fuser roll structure was observed after the final copy sheets were passed between the rolls.

Still another demonstration of the effectiveness of the heating system of the type herein contemplated was effected by forming electrostatic latent images on recording surfaces which were then developed by a heat fusable toner comprising carbon black pigmented copolymers, styrene-n-butylmethacrylate, the fusable toner particles being held on the recording surface in conformance with the electrostatic latent images. The toner images were thereafter transferred to plain paper. The paper having the toner images electrostatically adhered thereto were then passed, at a speed of 11 inches/second, between a fuser roll structure and a backup roll structure the former of which is heated to a temperature of 300°F. with the pressure of 96 psi being applied to the roll pair. The toner images contacted through the fuser roll structure which has a 2.0 inch outside diameter and is 15 inches long. The backup roll has an outside diameter of 2 inches with a 0.1 inch Viton layer on the surface and having a durometer of 65 Shore A. The fuser roll structure is fabricated from copper having an 8 micro-inch finish. A release agent consisting of low molecular weight polyethylene designated A.C.-8 by the Allied Chemical Corporation was liquified and metered onto the copper surface prior to contacting thereof by the toner images. No offsetting of toner to the fuser roll structure was observed after the final copy sheets were passed between the rolls.

While the invention has been described with respect to a preferred embodiment it will be apparent that certain modifications and changes can be made without departing from the spirit and scope of the invention and is the therefore intended that the foregoing disclosure be limited only by the claims appended hereto.

What is claimed is:

1. Apparatus for contact fusing toner particles to a substrate, said apparatus comprising:

an internally heated structure comprising a rigid core of a high surface energy material selected from the group consisting of glass and metal and a coating of a polymer release material on said core, said polymer release material being the type which oxidizes and is capable of reacting with the core surface material, said coating comprising a first barrier coating portion in contact with said core surface, said first portion being formed during operation of the apparatus at the interface of the core surface and the polymer release material, the first portion having a greater affinity for the core surface material than the toner particles and thereby preventing toner particles from contacting the core, and a second replenishing release portion continuously applied, the release portion being the polymer release material and having a cohesive force which is less than the adhesive forces between the toner particles and the substrate and the cohesive forces of the toner particles, said coatings having a combined thickness of less than 1 micron; and a backup member cooperating with said heated structure to form a nip through which said substrate passes with said toner particles contacting said heated structure.

2. Apparatus according to claim 1 wherein said barrier coating is a continuously renewable coating.

3. Apparatus according to claim 1 wherein said polymer release material comprises low molecular weight polyethylene.

4. Apparatus according to claim 3 wherein said rigid core is fabricated from steel.

5. Apparatus according to claim 1 wherein said barrier coating portion is produced through the chemical reaction of said core with the polymer release material applied to said core and said release portion comprises polymer release material applied to said core which has not chemically reacted with said core.

6. Apparatus according to claim 5 wherein said release material comprises low molecular weight polyethylene.

7. Apparatus according to claim 6 wherein said core is fabricated from steel.

8. A fuser roll structure for fusing toner images to a substrate wherein said toner images contact said roll structure, said structure comprising:

a rigid thermally conductive core of a high surface energy material selected from the group consisting of glass and metal and having an internal source of heat; and a coating of a polymer release material on said core, said polymer release material being the type which oxidizes and is capable of reacting with the core surface material, said coating comprising a first barrier coating portion in contact with said core surface, said first portion being formed during operation of the apparatus at the interface of the core surface and the polymer release material, the first portion having a greater affinity for the core surface material than the toner and thereby preventing toner from contacting the core, and a second replenishing release portion continuously applied, the release portion being the polymer release material and having a cohesive force which is less than the adhesive forces between the toner and the substrate and the cohesive forces of the toner, said coatings having a combined thickness of less than 1 micron.

9. Apparatus according to claim 8 wherein said release coating comprises low molecular weight polyethylene.

10. Apparatus according to claim 8 wherein said barrier coating is continuously renewable.

11. Apparatus according to claim 9 wherein said core is fabricated from copper.

12. Apparatus according to claim 8 wherein said barrier coating portion is produced through the chemical reaction of said core with the polymer release material applied to said core and said release portion comprises polymer release material applied to said core which has not chemically reacted with said core.

13. Apparatus according to claim 12 wherein said polymer release material comprises low molecular weight polyethylene.

14. Apparatus according to claim 13 wherein said core is fabricated from copper.

15. Apparatus for fusing toner images to a substrate, said apparatus comprising:

a heated roll structure comprising a rigid core of a high surface energy material selected from the group consisting of glass and metal and a coating of a polymer release material on said core, said polymer release material being the type which oxidizes and is capable of reacting with the core surface material, said coating comprising a first barrier coating portion in contact with said core surface, said first portion being formed during operation of the apparatus at the interface of the core surface and the polymer release material, the first portion having a greater affinity for the core surface material than the toner and thereby preventing toner particles from contacting the core, and a second replenishing release portion continuously applied, the release portion being the polymer release material and having a cohesive force which is less than the adhesive forces between the toner and the substrate and the cohesive forces of the toner, said coatings having a combined thickness sufficiently thin to constitute a minimal barrier to heat transfer; and a backup roll cooperating with said heated roll structure to form a nip through which said substrate moves with said toner images in contact with said heated roll structure.

16. Apparatus according to claim 15 wherein said barrier coating portion is produced through the chemical reaction of said core with the polymer release material applied to said core during operation of said fuser apparatus and said release portion comprises polymer release material applied to said core which has not chemically reacted with said core.

17. Apparatus according to claim 16 wherein said polymer release material comprises polyethylene having a molecular weight less than 10,000.

18. Apparatus according to claim 17 wherein said core is fabricated from steel.

19. The method of fusing toner images to a substrate including the steps of:

coating a heated fuser member of a high surface energy material selected from the group consisting of glass and metal with a polymer release material, said polymer release material being the type which oxidizes and is capable of reacting with the high surface energy material, said coating comprising a first barrier coating portion in contact with the surface of the fuser member, said first portion being formed during operation of the apparatus at the interface of the fuser member and the polymer release material, the first portion having a greater affinity for the high surface energy material of the fuser member surface than the toner and thereby preventing toner from contacting the fuser member surface, and a second replenishing release portion continuously applied, the release portion being the polymer release material and having a cohesive force which is less than the adhesive forces between the toner and the substrate and the cohesive forces of the toner, said coatings having a combined thickness of less than 1 micron;

contacting the toner images on said substrate for a period of time sufficient to soften the toner; and allowing the toner to cool.

20. The method of fusing toner images to a substrate including the steps of:

coating a fuser member of a high surface energy material selected from the group consisting of glass and metal with a polymer release material, said polymer release material being the type which oxidizes and is capable of reacting with the high surface energy terial, said coating comprising a first barrier coating portion in contact with the surface of the fuser member, said first portion being formed during operation of the apparatus at the interface of the fuser member and the polymer release material, the first portion having a greater affinity for the high surface energy material of the fuser member surface than the toner and thereby preventing toner from contacting the fuser member surface, and a second replenishing release portion continuously applied, the release portion being the polymer release material and having a cohesive force which is less than the adhesive forces between the toner and the substrate and the cohesive forces of the toner, said coatings having a combined thickness of less than 1 micron;

contacting said toner images with said coated fuser member for a time sufficient to soften the toner images; and allowing said softened toner to cool whereby said toner is adhered to said substrate.

21. The method according to claim 20 wherein the barrier coating is continuously renewable.

22. The method according to claim 20 wherein said polymer release material chemically reacts with the high surface energy material of the fuser member to form said barrier coating portion and said release portion is formed by non-reacted polymer release material.

23. The method according to claim 20 including the steps of contacting the non-imaged side of said substrate with a backup member simultaneously with the contacting of said toner images by said fuser member.

24. The method of fusing toner images to a substrate including the steps of:

contacting a heated fuser member of a high surface energy material selected from the group consisting of glass and metal with a polymer release material which is a solid at room temperature and a low viscosity liquid at operating temperatures, said polymer release material being the type which oxidizes and is capable of reacting with the high surface energy material, to form a coating on said fuser member, said coating comprising a first barrier coating portion in contact with said fuser member surface, said first portion being formed during operation of the apparatus at the interface of the fuser member surface and the polymer release material, the first portion having a greater affinity for the high surface energy material than the toner and thereby preventing toner from contacting the fuser member surface, and a second replenishing release portion continuously applied, the release portion being the polymer release material and having a cohesive force which is less than the adhesive forces between the toner and the substrate and the cohesive forces of the toner, said coatings having a combined thickness of less than 1 micron; and softening said toner images by contacting them with said fuser member.

25. Apparatus for contact fusing toner particles in image configuration to a substrate, said apparatus comprising:

an internally heated member comprising a core of a high surface energy material selected from the group consisting of glass and metal and a coating of a polymer release material on said core, said polymer release material being the type which oxidizes and is capable of reacting with the core surface material, said coating comprising a first barrier coating portion in contact with said core surface, said first portion being formed during operation of the apparatus at the interface of the core surface and the polymer release material, the first portion having a greater affinity for the core surface material than the toner particles and thereby preventing toner particles from contacting the core, and a second replenishing release portion continuously applied, the release portion being the polymer release material and having a cohesive force which is less than the adhesive forces between the toner particles and the substrate and the cohesive forces of the toner particles, said coatings having a combined thickness sufficiently thin to constitute a minimal barrier to heat transfer; and a backup roll cooperating with said heated member to form a nip through which said substrate passes with said toner particles contacting said heated member.

26. The method of fusing toner particles in image configuration to a substrate including the steps of:

coating a heated fuser member of a high surface energy material selected from the group consisting of glass and metal with a polymer release material on said fuser member, said polymer release material being the type which oxidizes and is capable of reacting with the fuser member surface material, said coating comprising a first barrier coating portion in contact with said fuser member surface, said first portion being formed during operation of the apparatus at the interface of the fuser member surface and the polymer release material, the first portion having a greater affinity for the high energy surface material than the toner particles and thereby preventing toner particles from contacting the fuser member, and a second replenishing release portion continuously applied, the release portion being the polymer release material and having a cohesive force which is less than the adhesive forces between the toner particles and the substrate and the cohesive forces of the toner particles, said coatings having a combined thickness of less than 1 micron; and contacting said substrate with said heated fuser member.

27. The method according to claim 26 wherein said coating step comprises the oxidation of at least some of said polymer release material to produce an acid which chemically reacts with the high surface energy material of said heated fuser member to form the first barrier coating portion.

28. The method according to claim 27 wherein said polymer release material comprises low molecular weight polyethylene.

29. The method according to claim 28 wherein said fuser member comprises a core fabricated from steel which chemically reacts with said acid.

30. Apparatus according to claim 15 wherein the axes of said heated roll structure and said backup roll are fixed relative to each other.

* * * * *